US009052876B2

(12) United States Patent
Willins

(10) Patent No.: US 9,052,876 B2
(45) Date of Patent: Jun. 9, 2015

(54) PEER-TO-PEER EVENT-TIME SECURED LINK ESTABLISHMENT

(75) Inventor: Bruce Willins, E. Northport, NY (US)

(73) Assignee: Symbol Technologies, LLC, Holtsville, NY (US)

(*) Notice: Subject to any disclaimer, the term of this patent is extended or adjusted under 35 U.S.C. 154(b) by 519 days.

(21) Appl. No.: 13/107,048

(22) Filed: May 13, 2011

(65) Prior Publication Data
US 2012/0290840 A1 Nov. 15, 2012

(51) Int. Cl.
H04L 29/06 (2006.01)
G06F 1/16 (2006.01)
H04W 12/06 (2009.01)
H04W 4/20 (2009.01)

(52) U.S. Cl.
CPC ............ *G06F 1/1694* (2013.01); *H04L 63/107* (2013.01); *H04W 12/06* (2013.01); *H04W 4/206* (2013.01); *G06F 2200/1636* (2013.01)

(58) Field of Classification Search
CPC .................................................... G06F 1/1694
USPC ........... 713/168, 170; 726/2–3; 455/410, 411, 455/168, 170
See application file for complete search history.

(56) References Cited

U.S. PATENT DOCUMENTS

| 7,865,140 | B2 * | 1/2011 | Levien et al. ................. 455/41.2 |
| 8,351,858 | B2 * | 1/2013 | Lee et al. .................... 455/41.2 |
| 2002/0123325 | A1 * | 9/2002 | Cooper ........................ 455/411 |
| 2004/0203357 | A1 * | 10/2004 | Nassimi ..................... 455/41.1 |
| 2007/0213045 | A1 * | 9/2007 | Hermansson et al. ........ 455/425 |
| 2008/0228429 | A1 * | 9/2008 | Huang et al. ................. 702/141 |
| 2008/0320587 | A1 * | 12/2008 | Vauclair et al. .............. 726/17 |
| 2009/0239470 | A1 * | 9/2009 | Sherman ...................... 455/41.2 |
| 2010/0069115 | A1 * | 3/2010 | Liu ............................. 455/556.1 |
| 2010/0210287 | A1 * | 8/2010 | De Vries et al. ........... 455/456.3 |
| 2011/0070837 | A1 * | 3/2011 | Griffin et al. ................ 455/41.3 |
| 2011/0314153 | A1 * | 12/2011 | Bathiche et al. ............. 709/225 |
| 2011/0319016 | A1 * | 12/2011 | Gormley et al. ............ 455/41.1 |
| 2012/0317297 | A1 * | 12/2012 | Bailey ........................ 709/229 |

FOREIGN PATENT DOCUMENTS

EP 2302885 A1 3/2011

OTHER PUBLICATIONS

Chong et al, Spatial co-location for device association: the connected object way, 2011, ACM, pp. 21-26.*
Mayrhofer, Shake Well Before Use: Intuitive and Secure Pairing of Mobile Devices, 2009, IEEE, vol. 8 Issue: 6, pp. 792-806.*
PCT International Search Report for Application No. PCT/US2012/030088 mailed Aug. 8, 2012.

* cited by examiner

*Primary Examiner* — Bradley Holder
*Assistant Examiner* — Ali Shayanfar

(57) ABSTRACT

A method establishes a secure authenticated connection between two devices. The method includes (A) obtaining data related to a tapping event between a first device and a second device, the data including time data of the tapping event; (B) selecting, by the first device, a target device; (C) establishing a non-authenticated secure communication link between the first device and the target device; (D) sending, by the first device, a challenge communication to the target device, the challenge communication including a request for a further data related to the tapping event; (E) receiving, by the first device, a response communication in response to the challenge communication, the response including the further data; (F) determining if the target device is the second device by matching the data with the further data; (G) if the target device is the second device, establishing a secure authenticated communication link between the first and second devices.

16 Claims, 3 Drawing Sheets

PEER-TO-PEER EVENT-TIME SECURED LINK ESTABLISHMENT

BACKGROUND

Collaborative device users within close proximity often desire to exchange information rapidly and securely over a peer-to-peer connection. Most of the time, these users do not share security credentials to perform a mutually authenticated connection.

Information exchange between two devices follows a conventional method. First, a user retrieves an email address and/or telephone number of another user. The first user then uses a messaging or email application to compose an email/message and sends it to the second user. The receiving user opens the email/message and views its contents. The two users subsequently have a verbal discussion/collaboration. However, the users never share security credentials to perform a mutually authenticated connection.

SUMMARY OF THE INVENTION

The present invention relates to a method for establishing a secure authenticated connection. The method comprises obtaining data related to a tapping event between a first device and a second device, the data including time data of the tapping event. The method comprises selecting, by the first device, a target device. The method comprises establishing a non-authenticated secure communication link between the first device and the target device. The method comprises sending, by the first device, a challenge communication to the target device, the challenge communication including a request for a further data related to the tapping event. The method comprises receiving, by the first device, a response communication in response to the challenge communication, the response including the further data. The method comprises determining if the target device is the second device by matching the data with the further data. The method comprises if the target device is the second device, establishing a secure authenticated communication link between the first and second devices. A level of authentication security is improved by predefining an accuracy of step F, requiring a higher resolution of the time data.

DETAILED DESCRIPTION

Figure 1:
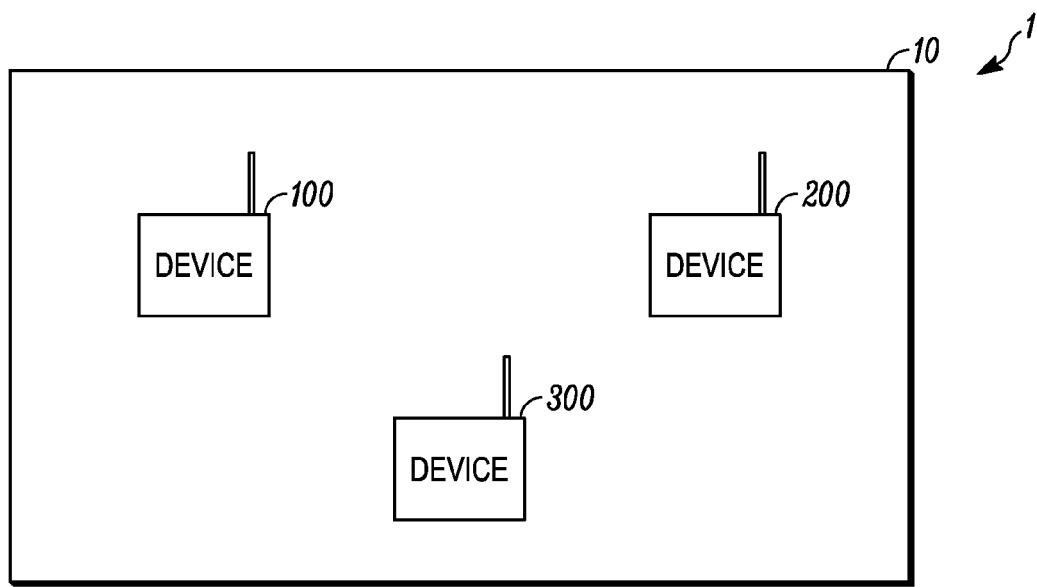
FIG. 1 shows an exemplary embodiment of a system according to the present invention.

The exemplary embodiments may be further understood with reference to the following description and the appended drawings, wherein like elements are referred to with the same reference numerals. The exemplary embodiments relate to generating a peer-to-peer authenticated secure link between two devices. In particular, the exemplary embodiments provide a system and method in which the two devices exchange data after establishing the secure authenticated connection via a tapping event.

FIG. 1 shows an exemplary embodiment of a system 1 according to the present invention. The system 1 of FIG. 1 may include a plurality of devices 100, 200, and 300. It should be noted that that although the system 1 has been shown to include three devices, the system 1 may include fewer or more devices than illustrated in FIG. 1. The devices 100, 200, 300 may be, for example, mobile devices and/or stationary devices such as mobile phones, PDAs, smartphones, tablets, printers, computers, etc. The system 1 of the present invention relates to at least one device that is capable of being physically tapped against another device.

The system 1 may also relate to an area 10 in which the devices 100, 200, 300 are disposed. As discussed above, one of the devices 100, 200, 300 may physically tap another one of the devices 100, 200, 300. Therefore, the area 10 may be any dimension that allows for the tapping between two devices. It should be noted that the devices 100, 200, 300 being disposed in the area 10 may be at a time prior to a tapping event occurring. That is, the devices 100, 200, 300 disposed in the area 10 shows that the device 100 is in a tapping vicinity of either device 200 or 300. as will be described in further detail below, once a tapping event occurs, the devices 100, 200, 300 may no longer be disposed in the area 10.

Figure 2:
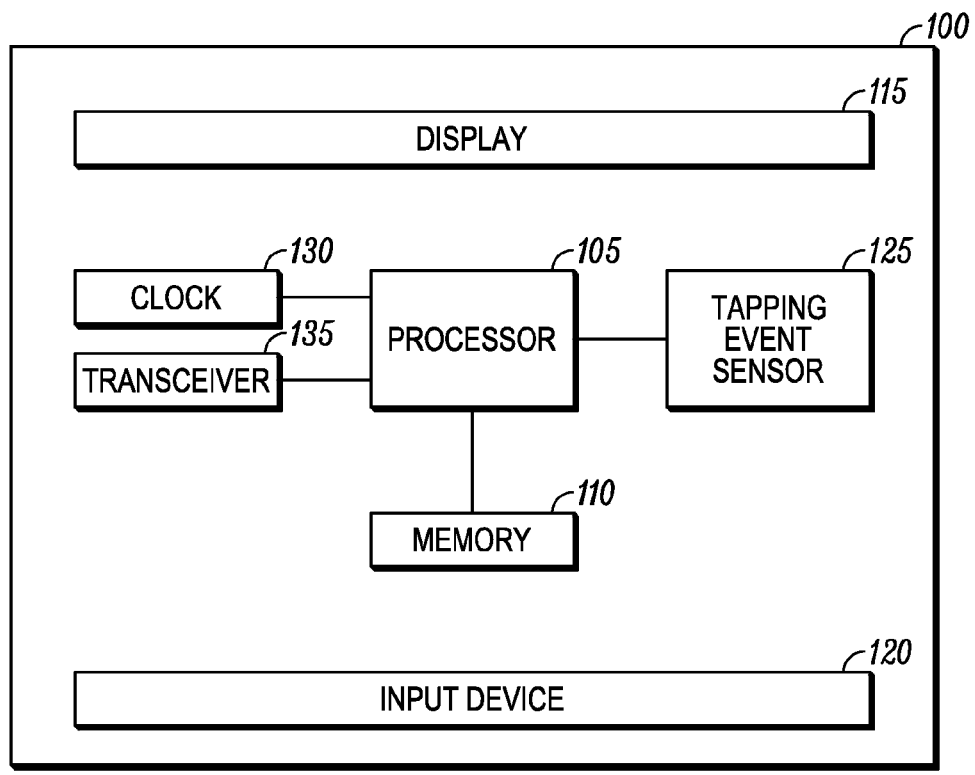
FIG. 2 shows an exemplary embodiment of a device according to the present invention.

FIG. 2 shows components of the device 100 of FIG. 1 according to an exemplary embodiment. The device 100 may be a mobile device. Thus, the mobile device 100 may be any electronic device that is portable. The components of the mobile device 100 may include a processor 105, a memory 110, a display 115, an input device 120, a tapping event sensor 125, a clock 130, and a transceiver 135. It should be noted that the device 100 may include a variety of other conventional components such as a power supply, ports to connect to other devices, a speaker, etc.

The processor 105 may provide conventional functionalities for the mobile device 100. For example, the mobile device 100 may include a plurality of applications that are executed on the processor 105 such as an application including a web browser when connected to a network via the transceiver 135. The mobile device 100 may also include an application related to a tapping event as will be described in further detail below. The memory 110 may also provide conventional functionalities for the mobile device 100. For example, the memory 110 may store data related to operations performed by the processor 105. In particular, for the tapping event application, the memory 110 may store a tapping event time provided by the clock 130.

The display 115 may be any conventional display that is configured to display data to the user. For example, the display 115 may be an LCD display, an LED display, a touch screen display, etc. The input device 120 may be any conventional input component such as a keypad, a mouse, etc. If the display 115 is a touch screen display, allowing the user to enter information through the display 115, then the input device 120 may be optional.

The tapping event sensor (TES) 125 may be any component configured to detect a tapping event. For example, TES 125 may include a microphone to detect a sound. The sound may be compared to a predetermined decibel value to indicate that a tapping event occurred. Alternatively, the TES 125 may include an accelerometer that detects a sudden change in the acceleration of the device 100. The sudden change may be when an acceleration rapidly decreases to indicate a tapping event has occurred. It should be noted, however, that the TES 125 may include a single component or any combination thereof such as a microphone and an accelerometer to improve the accuracy of detecting a tapping event.

The clock 130 may be any convention time-keeping device. For example, the clock 130 may be a stand-alone clock whose time is based on the processor 105. Alternatively, the clock 130 may be a network synchronized clock that may synchronize the time with a server or other device on a network via the transceiver 135.

The transceiver 135 may be any conventional transceiver capable of wirelessly communicating with other devices by transmitting and/or receiving data. For example, the transceiver 135 may communicate using at least one of the 802.11 wireless protocols, BLUETOOTH technology, infrared technology, etc.

The devices 200, 300 may be substantially similar to the device 100. For example, the devices 200, 300 may include at least a processor, a tapping event sensor, a clock, and a communications component such as a transceiver or wired connection. It should be noted, however, that the devices 200, 300 may include additional elements related to other functionalities. For example, if the device 200 is a stationary printer, components related to printing may be included.

According to the exemplary embodiments, a user may wish to establish a secure authenticated connection between the device 100 and one of the devices 200, 300. The user may physically tap the device 100 against the target device (e.g., device 200). When the user physically taps the device 100 against the target device, the tapping event is detected by the TES 125, which requests that the clock 130 record the time of the tapping event. The target device also records the time of the tapping event if configured to do so (e.g., includes the tapping event application). The time of the tapping event may be temporarily stored for a predetermined duration. For example, if a connection is to be established with a local device, so an immediate connection is desired, the tapping event time may be stored for a short duration. In another example, if a connection is to be established with a network device in which the device 100 may be moved out of the area 10, the tapping event time may be stored for a longer duration to allow the connection to be made at a later time.

According to the exemplary embodiments, the clock 130 may record times at a predetermined resolution. For example, the resolution may at a certain minute value, second value, milli-second value, etc. The resolution of the recorded time may further increase a level of authentication. Thus, a higher resolution may have an improved authentication security.

As discussed above, once the tapping event occurs, the device 100 may exit the area 100. Also as discussed above, the device 100 may be configured to communicate directly with other devices or indirectly through a network via the transceiver 135. Subsequent to the tapping event, the device 100 may want to establish a secure authenticated connection with the target device that was tapped. If the devices 100, 200, 300 remain within the area 10, the device 100 may generate a list of local devices that are within a proximity determined by the transceiver 135. Using the transceiver 135, the device 100 may detect the devices 200, 300 in its proximity using any of the above-mentioned wireless protocols. These proximate devices are displayed to the user via the display 115. In another example, if the device 100 leaves the area 10, the device 100 may still generate a list of connectable devices through a network. The target tapped device may be part of the network and, therefore, be included in this list.

Subsequently, the user may select a device from the list using, for example, the input device 120 or, if the display is a touch screen, the display 115. In response to the user selection, the device 100 and the selected device may establish a non-authenticated secure link. For example, the link may be a secure link established using Diffie Helman. It should be noted, however, that the link may be a secure or non-secure link using any known protocol. It should also be noted that the selection may be manual or may be automatic. For example, the tapping event application may select a device from the list. The automatic selection may be performed in a variety of ways. In a first example, a proximity criterion may be used so the selection is one that is closest to the device 100. In a second example, randomness may be used to select any device in the list. In a third example, predetermined criteria may be used, such as the type of device, and the selection may order the list from a highest to a lowest relevance.

After the non-authenticated secure link between the device 100 and the selected device is established, the devices may optionally synchronize their clocks 130 if there is a time discrepancy. As discussed above, the clock 130 may be independently maintained, thereby potentially having a different time than another clock. When it is determined that both clocks are in sync, the device 100 sends a challenge to the user-selected device via the transceiver 135. In the exemplary embodiment of the present invention, this challenge may be a Nonce. The challenge may request that the selected device provide a response. However, it should be noted that any cryptographic protocol may be used to challenge the selected device. It should also be noted that the synchronization of clocks is only exemplary. According to another exemplary embodiment, any discrepancy between the clocks may be stored, for example, in the memory 110 without an actual synchronization.

If the selected device is the target device which was previously tapped by the device 100, the target device will respond to the challenge by combining the challenge with the tapping event time it recorded. This combination is sent to the device 100. It should be noted that the response may be encoded, for example, by putting the combination through a cryptographic function. In the exemplary embodiment, the cryptographic function may a one-way hash function that results in a message digest (MD). However, it should be noted, that any cryptographic function may be used.

Upon the device 100 receiving the MD, the MD is validated by comparison with the tapping event time recorded on the device 100 via the clock 130. In the exemplary embodiment, the recorded time is retrieved from the memory 110. However, it should be noted that the time may be retrieved from any of the elements of the device 100. If the time in the MD matches the time recorded by the clock 130, the tapping event application may indicate that the selected device is the target device that was previously tapped. Subsequently, the device 100 may establish a secure authenticated connection with the target device. It should be noted that the connection may be established manually upon the indication or may be established automatically by the tapping event application.

It should be noted that the target device may also perform the verification with the device 100. That is, the device 100 may have authenticated that the selected device is the target device that was tapped. However, the target device may also authenticate that the device 100 was the device that was involved in the tapping event. The target device may perform a substantially similar set of steps as described above to verify the device 100 so that the secure authenticated connection is established.

If the selected device is not the target device, the selected device may be incapable of providing a response. For example, the selected device may not be configured with the tapping event application. In another example, the selected device may include the tapping event application and associated hardware. Thus, a response may be provided to the challenge in a substantially similar manner as discussed above. However, when the device 100 compares the MD to the tapping event time recorded thereon, the selected device will be invalidated as the target tapped device. The tapping event application may indicate the invalidation. Subsequently, the user may select another device on the list or the tapping event application may automatically select another device. This process may continue until the target device has been found.

Figure 3A:
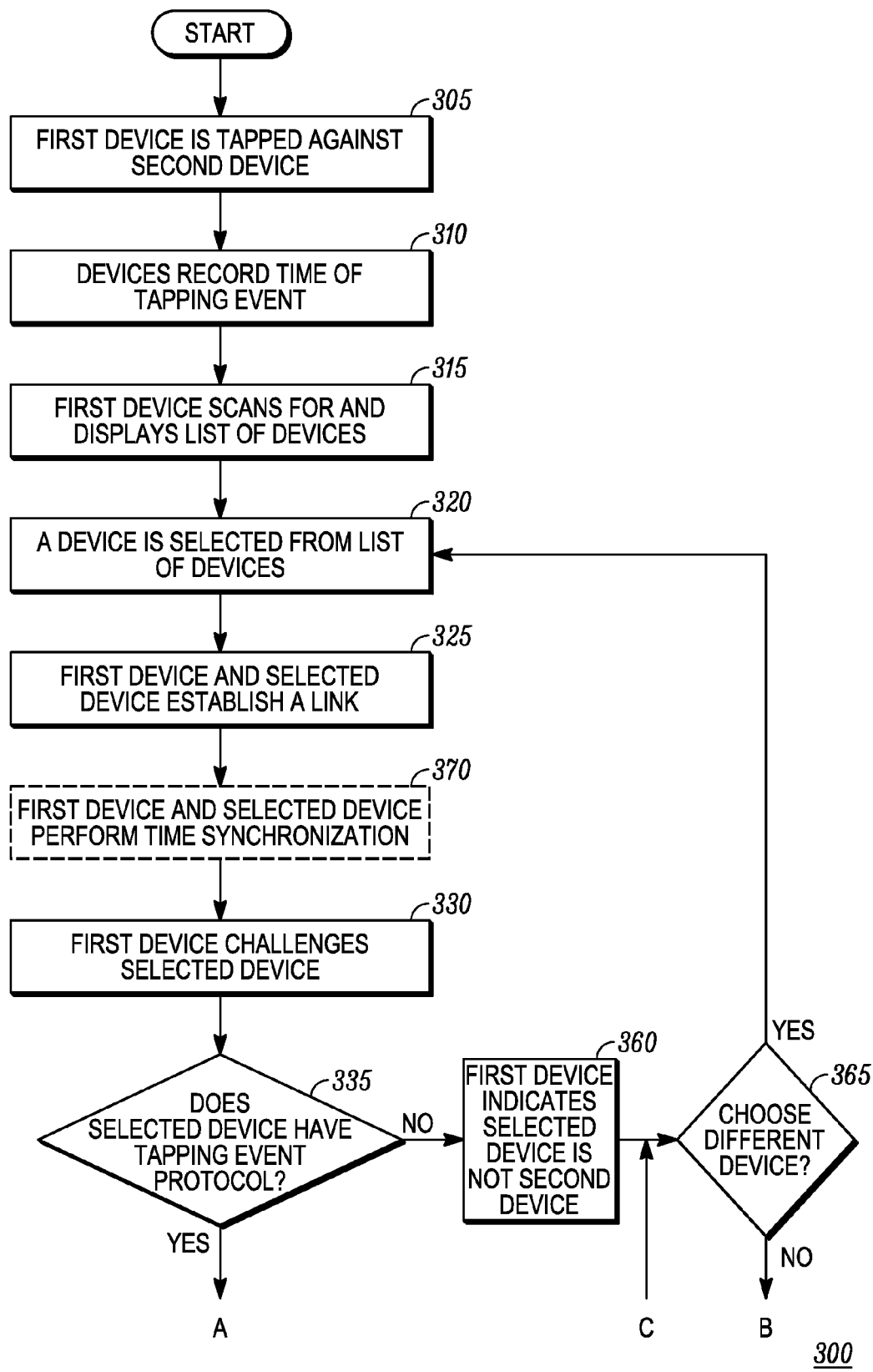
FIGS. 3A and 3B show an exemplary embodiment of a method according to the present invention.
Figure 3B:
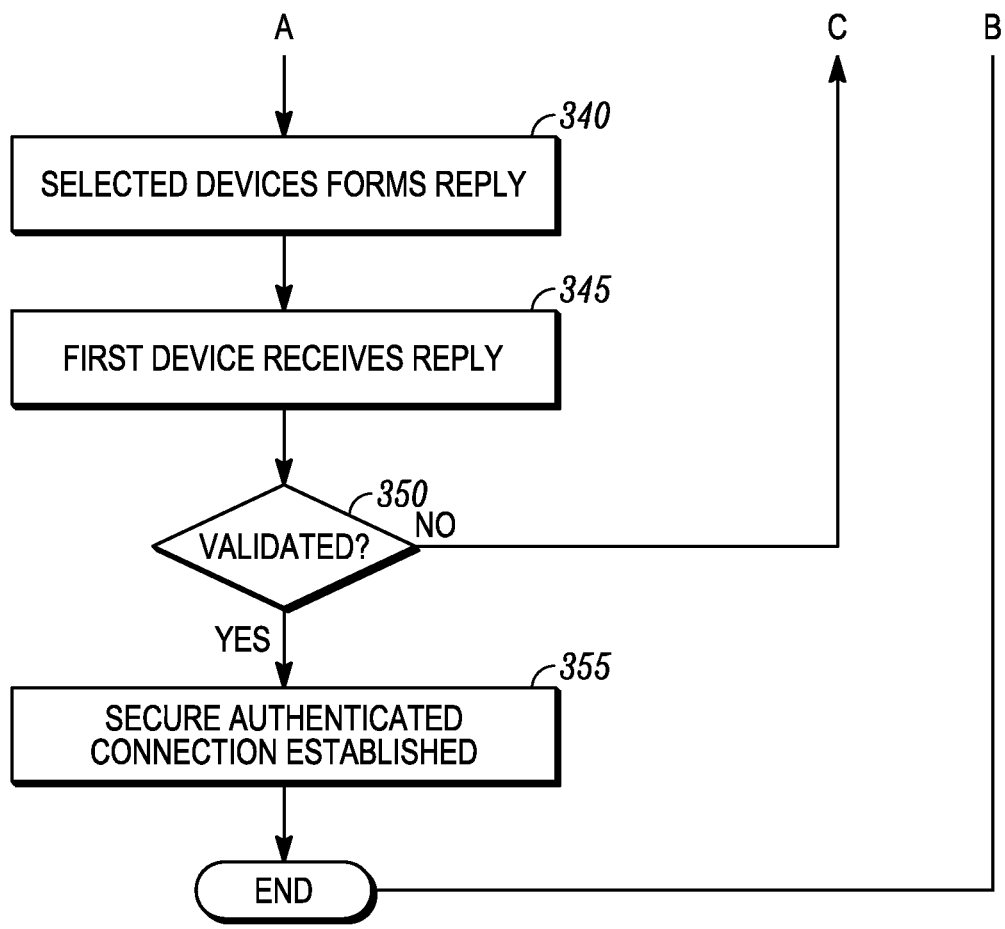

FIGS. 3A and 3B show an exemplary embodiment of a method 300 according to the present invention. The method 300 relates to establish a secure authenticated connection between a first device and a target device using a tapping event to validate the identity of the target device. The method 300 will be described with reference to the system 1 of FIG. 1 and the device 100 of FIG. 2.

The method 300 begins with step 305, in which the device 100 is physically tapped against a target device 200. The tapping may indicate that the user of device 100 wishes to establish a connection with the target device 200 at some point. At step 310, each device records the time of the tapping event. As discussed above, the time may be indicated by the clock 130 and stored in the memory 110.

At step 315, the device 100 detects and displays a list of devices to the user. As discussed above, the list may include all local, nearby devices or may include network devices. At step 320, a target device is selected from the list. As discussed above, the user may manually select a device from the list or the tapping event application may automatically make the selection. However, it should be noted that the selected device may not be the target device which the user tapped because a validation is subsequently performed to determine whether or not the selected device is the target device which was previously tapped, as will be discussed in further detail below.

At step 325, the device 100 requests the setup of a non-authenticated secure link. As previously explained, this link may be a secure connection using, for example, Diffie Helman. However, it should again be noted that any type of link capable of data transmission between the devices is possible. After the link is established, both devices may perform an optional step 370 if a discrepancy exists between the time of their respective clocks. This optional step performs a time-synchronization handshake to normalize any differences between the clocks of the two devices.

After a time discrepancy is determined (with or without performing step 370), at step 330, the device 100 sends a challenge to the selected device. As previously explained, this challenge may be in the form of a Nonce (e.g., a random value). If, at step 335, the selected device is also configured with the tapping event application, the method continues to step 340, in which the selected device forms a reply. As previously explained, this reply may include a combination of the Nonce with the tapping event time recorded by the selected device. The combination is put through a one-way hash function resulting in MD, which is subsequently sent to the device 100. It should again be noted however, that the combination may be put through any cryptographic function known in the art. When the device 100 receives the reply at step 345, a validation is performed at step 350. In the exemplary embodiment, this validation is performed by validating the time in the MD against the time recorded by the device 100. If the times match, the device 100 authenticates the selected device as the target device and a secure authenticated connection may be established between the two devices at step 355.

If, at step 335, the target device is not configured with the tapping event application, it will not be able to respond to the challenge. As a result, the device 100 will indicate to the user, at step 360, that the selected device is not the target device. At step 365, the user will be given the option of selecting a different selected device from the list of devices. If the selected device is not validated in step 350, the method 300 will also return to step 365. If the user decides to select another device, the method will return to step 320 and the steps previously outlined will be performed.

As discussed above, the target device may also perform a verification that the device 100 was also involved in the tapping event of step 305. Thus, a mutual authentication may be performed to ensure that both devices verify each other to establish the secure authenticated connection in step 355. Accordingly, the method 300 may include a second set of steps for the target device in which, for example, steps 330-355 are also performed.

The exemplary embodiments provide an improved means of generating a peer-to-peer authenticated secure link between two devices. In particular, the exemplary embodiments provide a system and method in which the two devices exchange data after establishing a secure connection when a target device is authenticated via a tapping event. When two devices detect a tapping event, the time of the tapping event is recorded. A connection is established between the devices for authentication. If the selected device is the same device that was previously tapped, the selected device will respond to a challenge by a first device with the correct tapping event time, thereby allowing a secure authenticated connection between the two devices to be established.

Those skilled in the art will understand that the above described exemplary embodiments may be implemented in any number of ways, including, as a separate software module, as a combination of hardware and software, etc. for example, the tapping event application may be a program containing lines of code that, when compiled, may be executed on the processor 105.

It will be apparent that the wireless device may be any type of mobile device such as a mobile phone, PDA, tablet, smartphone, etc. Also, the target device(s) may also be one of many different types of portable or stationary devices such as printers, mobile devices, computers, scanners, PDAs, etc. It will also be apparent to those skilled in the art that various modifications may be made to the disclosed exemplary embodiments and methods and alternatives without departing from the spirit or scope of the disclosure. Thus, it is intended that the present disclosure cover modifications and variations provided that they come within the scope of the appended claims and their equivalents.

What is claimed is:

1. A method, comprising:
   storing, by a first device and a second device, data related to a tapping event, defined as the first device and the second device being physically tapped together, the data including time data of the tapping event;
   selecting, by the first device, a target device;
   establishing a non-authenticated secure communication link between the first device and the target device;
   sending, by the first device, a challenge communication to the target device, the challenge communication including a request for a time data of the tapping event as stored by the target device, while withholding the time data of the tapping event stored by the first device;
   receiving, by the first device, a response communication in response to the challenge communication, the response including a further data, where the further data comprises the time data of the tapping event as stored by the target device;
   determining if the target device is the second device by matching the data with the further data; whereupon sending, by the second device, a further challenge communication to the first device while withholding the time data of the tapping event stored by the second device;

receiving, by the second device, a further response communication in response to the further challenge communication;

determining if the first device is related to the tapping event; and when the target device is the second device, establishing a secure mutually authenticated communication link between the first device and the second device in order to share security credentials using a peer-to-peer connection.

2. The method of claim 1, wherein the storing of the data related to the tapping event further comprises:
detecting the tapping event by the first and second device based on predetermined sensor data.

3. The method of claim 2, wherein the sensor data comprises at least one of an acceleration data and a sound data.

4. The method of claim 1, wherein the first device selects the target device from a list of devices which are situated in a predetermined proximity to the first device, the second device being included in the list.

5. The method of claim 1, wherein the first device selects the target device by broadcasting a detection notification of the tapping event and processing a response to the detection notification.

6. The method of claim 1, wherein the challenge communication comprises a random value.

7. The method of claim 6, wherein the response communication comprises the random value.

8. The method of claim 1, wherein the data and the further data are encrypted using a predetermined encryption method.

9. A device, comprising:
a hardware processor configured to select a target device for communication;
a memory for storing a time data of a tapping event, defined as the device, which is a first device, being physically tapped against a second device;
a sensor detecting an occurrence of the tapping event that includes a physical contact between the first device and the second device;
a clock recording the time of the tapping event;
selecting, by the first device, a target device; and
a transceiver configured to communicate with the target device, the transceiver further configured to:
establish a non-authenticated secure communication link between the first device and the target device;
send a challenge communication to the target device, the challenge communication including a request for a time data of the tapping event as stored by the target device, while withholding the time data of the tapping event stored by the first device;
receive a response communication in response to the challenge communication, the response including a further data, where the further data comprises the time data of the tapping event as stored by the target device;
provide the further data to the processor to determine if the target device is the second device by matching the stored time data with the further data; whereupon
receive from the second device a further challenge communication to the first device while withholding the time data of the tapping event stored by the second device;
send, to the second device, a further response communication in response to the further challenge communication, such that the second device can determine if the first device is related to the tapping event; and
when the target device is the second device, establish a secure mutually authenticated communication link between the first device and the second device in order to share security credentials using a peer-to-peer connection.

10. The device of claim 9, wherein the sensor detects the occurrence of the tapping event based on predetermined sensor data, the sensor data comprising at least one of an acceleration data and a sound data.

11. The device of claim 9, further comprising:
a display configured to show a list of a plurality of further devices, the target device being included in the list; and
an input component configured to receive a selection from the list for the second device.

12. The device of claim 11, wherein the plurality of the further devices are situated in predetermined proximity to the first device.

13. The device of claim 11, wherein the transceiver is configured to broadcast a detection notification of the tapping event.

14. The device of claim 9, wherein the challenge communication comprises a random value and the response communication includes a random value.

15. The device of claim 9, wherein the time of the tapping event and the further data are encrypted using a predetermined encryption method.

16. A system, comprising:
a first computer device configured to detect an occurrence of a tapping event, defined as a physical contact between the first computer device and a second computer device, the first computer device further configured to record and store a time data of the tapping event and select a target device for communication; and
the second computer device configured to detect an occurrence of the tapping event, the second computer device further configured to record and store the time of the tapping event;
where the first computer device is configured to:
establish a non-authenticated secure communication link between the first computer device and the target device,
send a challenge communication to the target device, the challenge communication including a request for a time data of the tapping event as stored by the target device, while withholding the time data of the tapping event stored by the first computer device,
receive a response communication in response to the challenge communication, the response including a further data, where the further data comprises the time data of the tapping event as stored by the target device, and
determine if the target device is the second computer device by matching the stored time data with the further data; whereupon the second computer device is configured to:
send a further challenge communication to the first computer device while withholding the time data of the tapping event stored by the second computer device,
receive a further response communication in response to the further challenge communication, and
determine if the first computer device is related to the tapping event; and
when the target device is the second computer device, the system is configured to establish a secure mutually authenticated communication link between the first computer device and the second computer device in order to share security credentials using a peer-to-peer connection.

* * * * *